(12) United States Patent
Ore et al.

(10) Patent No.: US 7,121,395 B2
(45) Date of Patent: Oct. 17, 2006

(54) TORQUE DISCONNECT MECHANISM

(75) Inventors: Thomas G. Ore, Cedar Falls, IA (US); Paul W. Johnson, Denver, IA (US); John C. Gogola, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 408 days.

(21) Appl. No.: 10/217,298

(22) Filed: Aug. 12, 2002

(65) Prior Publication Data
US 2004/0026205 A1    Feb. 12, 2004

(51) Int. Cl.
F16D 11/04    (2006.01)
F16H 63/04    (2006.01)

(52) U.S. Cl. .................. 192/69.9; 192/93 R; 74/333

(58) Field of Classification Search ............... 192/22, 192/24, 25, 28, 29, 110 R, 112, 69.9; 74/333
See application file for complete search history.

(56) References Cited

U.S. PATENT DOCUMENTS

| 2,685,210 A | * | 8/1954 | Heisler | 74/370 |
| 3,839,883 A | * | 10/1974 | Braess | 464/87 |
| 4,244,455 A | * | 1/1981 | Loker | 192/24 |
| 4,566,566 A | * | 1/1986 | Vuillet | 192/24 |
| 4,618,046 A | * | 10/1986 | Sassen | 192/69.62 |
| 4,951,792 A | * | 8/1990 | Egawa | 192/69.9 |
| 5,085,305 A | * | 2/1992 | Cheng | 192/69.82 |
| 5,560,432 A | * | 10/1996 | Conte | 172/103 |
| 6,378,393 B1 | | 4/2002 | Bates | 74/473.18 |
| 6,648,118 B1 | * | 11/2003 | Wu et al. | 192/69.9 |

FOREIGN PATENT DOCUMENTS

| DE | 4020959 | 1/1991 |
| DE | 19616356 | 12/1996 |

OTHER PUBLICATIONS

Deere & Company, AutoPowr Transmission, 2001.
Deere & Company, Torque Disconnect, date unknown.

* cited by examiner

Primary Examiner—Saul Rodriguez

(57) ABSTRACT

A torque disconnect mechanism controls transmission of torque from a first shaft to a second shaft in a transmission. The mechanism includes a housing which rotatably supports the first and second shafts, and which has an opening formed therein. A coupling member is movable from an engaged position wherein the coupling member couples the first shaft with the second shaft to a disengaged position wherein the first and second shafts are uncoupled from each other. A plug member is mountable in the opening and is engagable with the coupling member. The plug member is movable from a first position holding the coupling member in its engaged position to a second position holding the coupling member in its disengaged position.

5 Claims, 4 Drawing Sheets

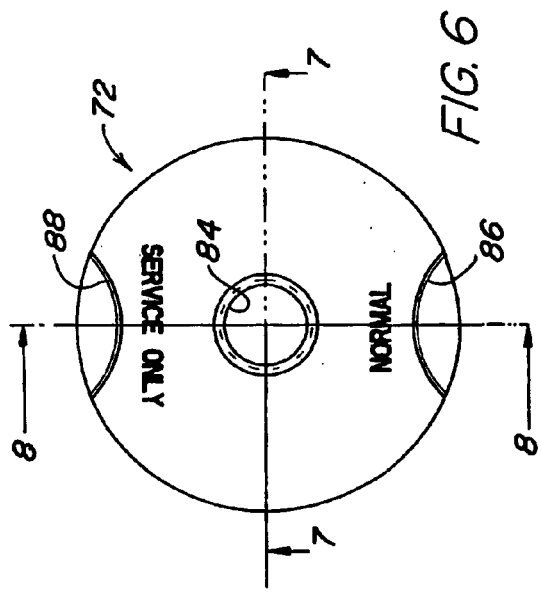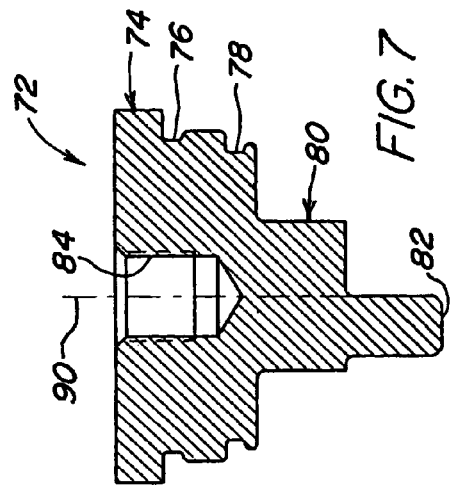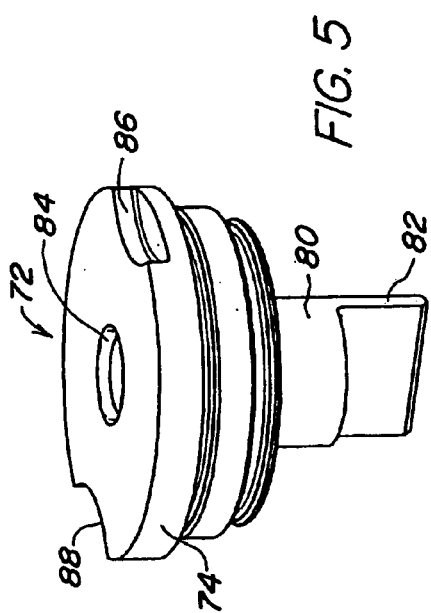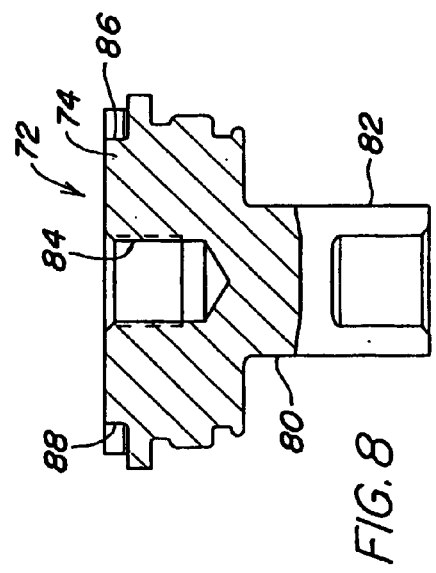

TORQUE DISCONNECT MECHANISM

BACKGROUND OF THE INVENTION

The present invention relates to a mechanism for coupling and uncoupling components of a transmission and controlling the transmission of torque therebetween.

When servicing or diagnosing a transmission it is desirable to disconnect the transmission output shaft and prevent torque from being transmitted to the output shaft. A transmission on a production John Deere tractor includes a sliding collar which couples and uncouples a pair of gears which transmit torque from a planetary transmission shaft to the transmission output shaft. A pivoting shift fork is coupled between the collar and an arm which extends outside the transmission. A long release rod extends to the rear of the tractor and engages a spring-loaded bracket. Because of tolerance stackup it is possible for the fork to rub on the collar during normal operation, and the parts take up space at the rear of the tractor, yet these parts are rarely used.

SUMMARY

Accordingly, an object of this invention is to provide a simpler torque disconnect device with fewer parts.

These and other objects are achieved by the present invention, wherein a torque disconnect mechanism controls transmission of torque from a first shaft to a second shaft in a transmission. The torque disconnect mechanism includes a drive gear rotatably mounted on the first shaft. The drive gear has a first set of drive splines which meshingly engage corresponding splines on the second shaft, and a second set of drive splines. A hub gear is fixed for rotation with the first shaft and includes a set of hub splines. A coupling member is engagable with the drive gear and with the hub gear, and is movable from an engaged position wherein the coupling member couples the hub splines with the second set of drive splines to a disengaged position wherein the hub splines are uncoupled from the second set of drive splines. A plug member is mounted in a housing opening and is engagable with the coupling member. The plug member is movable from a first position holding the coupling member in its engaged position to a second position holding the coupling member in its disengaged position.

BRIEF DESCRIPTION OF THE DRAWINGS

FIG. 5 is a perspective view of the plug of FIG. 1;

FIG. 6 is a top view of the plug of FIG. 1;

FIG. 7 is a sectional view along lines 7—7 of FIG. 6; and

FIG. 8 is a sectional view along lines 8—8 of FIG. 6.

DETAILED DESCRIPTION

Figure 1:
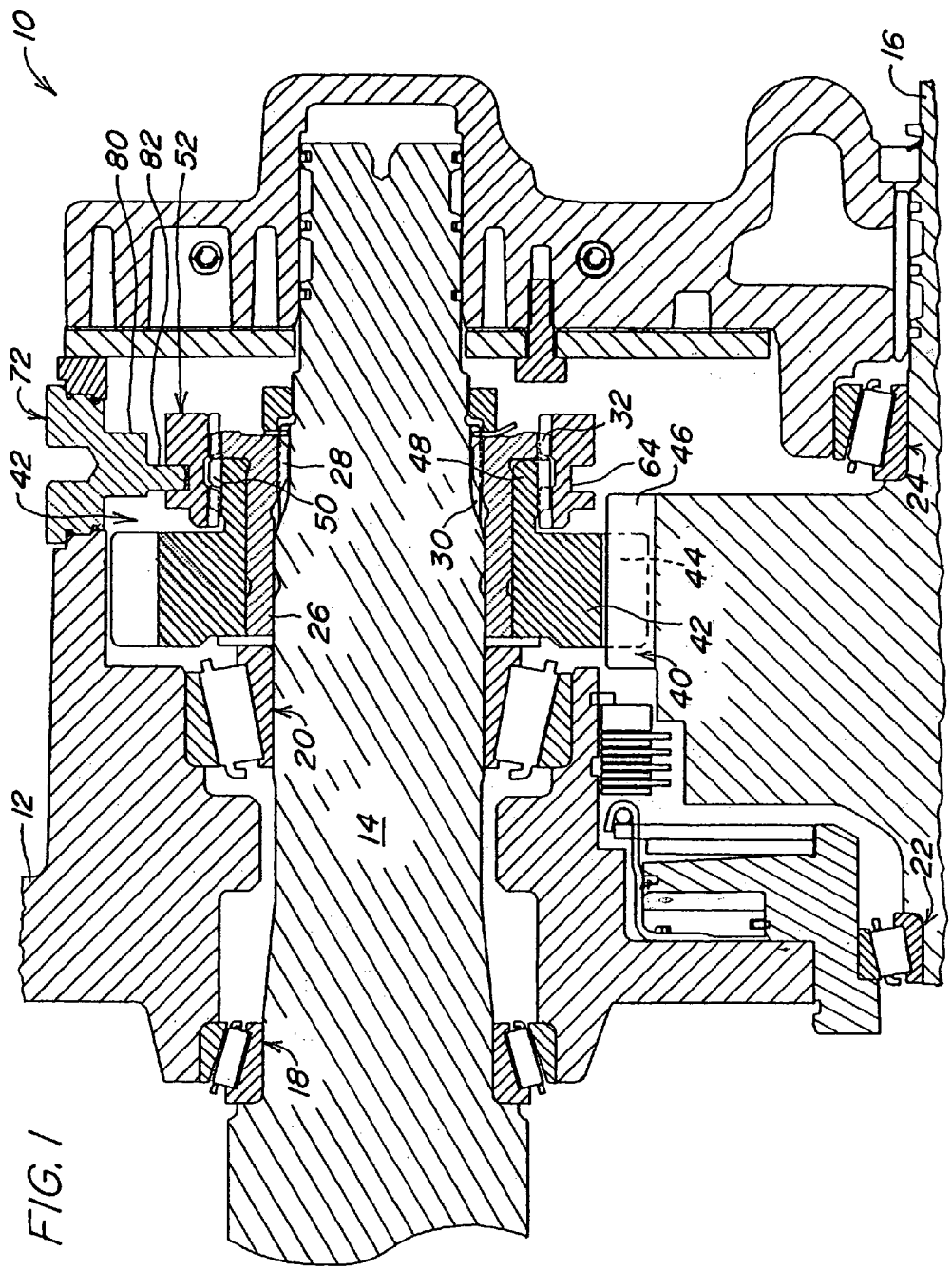
FIG. 1 is a simplified sectional view of the present invention in a torque transmitting position.

FIG. 1 shows a portion of a transmission 10 which includes a housing 12 which rotatably supports a shaft 14 and a shaft 16. Shafts 14 and 16 are spaced radially apart from each other. Shaft 14 may be a planetary output shaft and shaft 16 may be a transmission output shaft. Shaft 14 is supported by bearings 18 and 20, while shaft 16 is supported by bearings 22 and 24. A hollow hub gear 26 is mounted on shaft 14. Gear 26 includes inner splines 28 which engage outer splines 30 on the shaft 14. Gear 26 also includes outer splines 32.

A drive gear 40 is rotatably mounted on a portion of the hub gear 26. Drive gear 40 includes a large diameter part 42 on which are formed splines 44. Splines 44 engage corresponding splines 46 on shaft 16. Drive gear 40 also includes a smaller diameter part 48 on which are formed splines 50 which are axially adjacent to splines 32 of hub gear 26.

Figure 3:
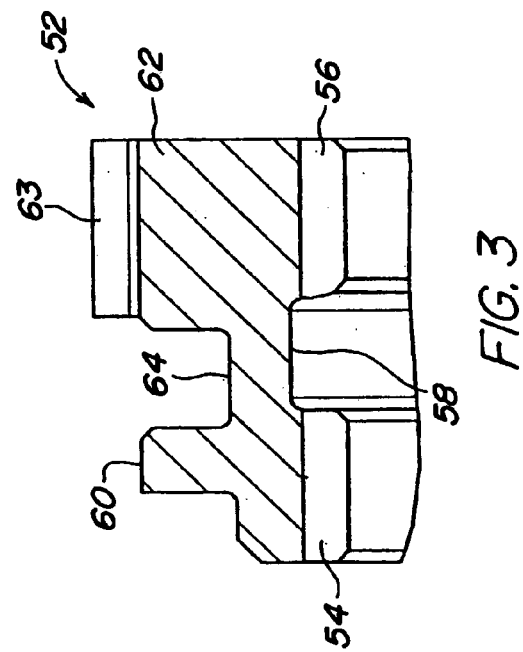
FIG. 3 is a partial sectional view of the collar of FIG. 1.
Figure 4:
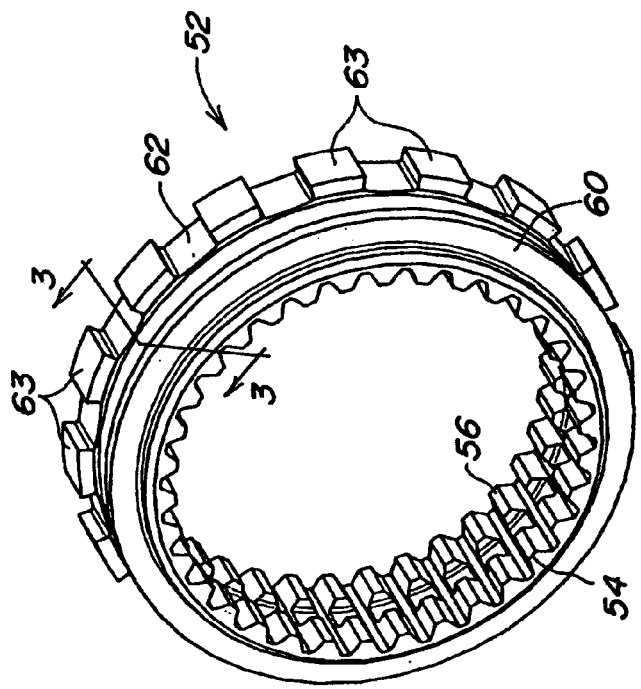
FIG. 4 is a perspective view of the collar of FIG. 1.

An annular collar 52 is mounted over the splines 50 and 32. As best seen in FIG. 3, collar 52 has a generally cylindrical body with a pair of axially spaced apart sets of splines 54 and 56 separated by an radially inwardly opening annular groove 58. The outer surface of the collar 52 forms a pair of lands 60 and 62 separated by an outer annular groove 64. As best seen in FIG. 4, a plurality of teeth 63 may be formed on land 62 for use with a standard magnetic speed sensor (not shown).

Figure 2:
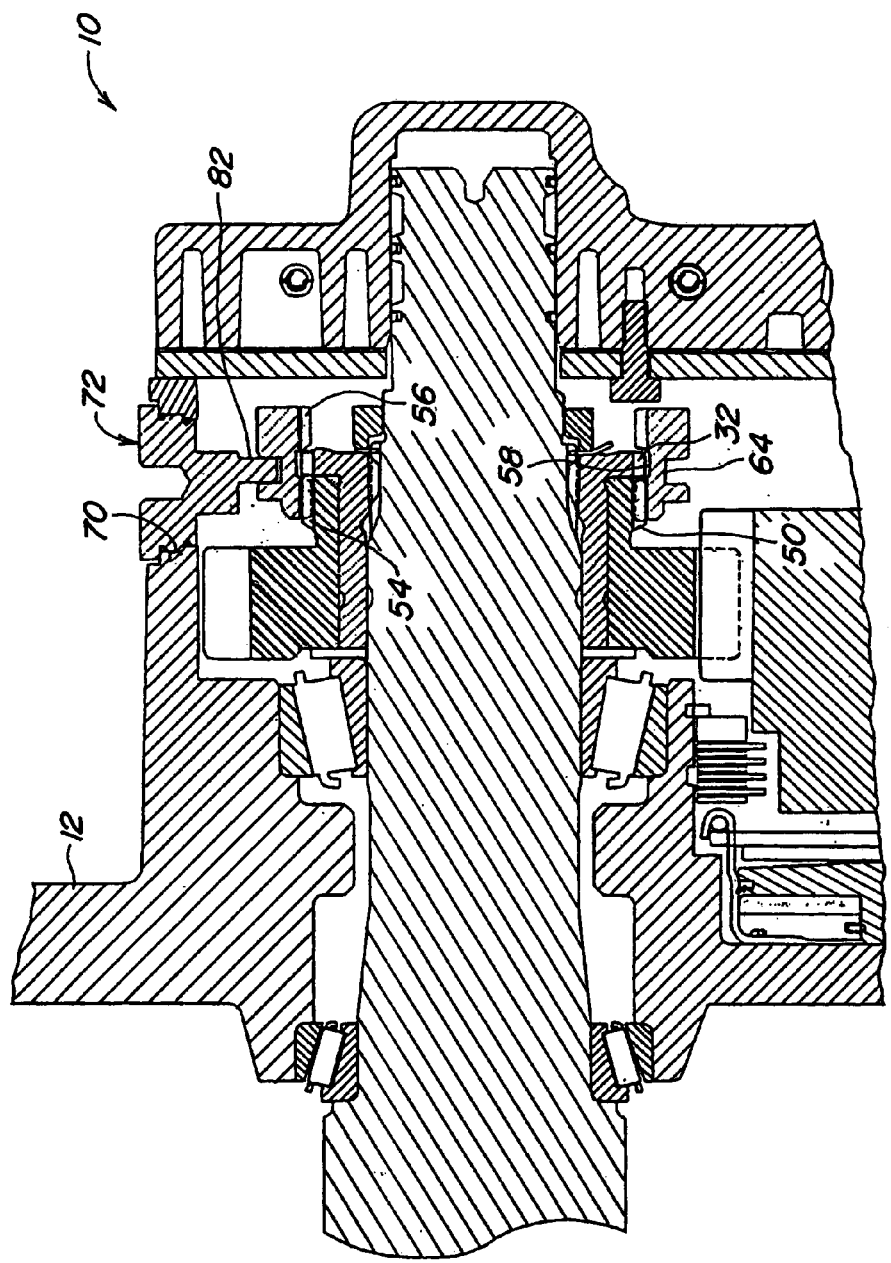
FIG. 2 is a view similar to FIG. 1, but showing the present invention in a torque-disconnect position.

Referring to FIGS. 1 and 2, housing 12 has an opening 70 formed therein. A service disconnect plug 72 is removably mounted in the opening 70. As best seen in FIGS. 4–7, plug 72 has a generally cylindrical head portion 74 in which are formed a pair grooves 76 and 78 for receiving O-ring seals. A central cylindrical shaft 80 projects axially away from head 74. A tab 82 projects axially away from one side of the end surface of shaft 80. A threaded central blind bore 84 extends into an outer surface of the head 74 for receiving a threaded tool (not shown) for use in manipulating the plug 72. As best seen in FIG. 5, textual instructional labels may be printed on the end surface of the head 74 to guide an operator in orienting the plug 72 in the opening 70. As best seen in FIGS. 4, 5 and 7, a pair of partial circular cutouts 86 and 88 are formed in a radial outer peripheral surface of the head 74. As best seen in FIG. 6, the tab 82 is offset from, or positioned entirely on one side of a central axis 90 of the head 74.

With the plug 72 oriented in opening 70 as shown in FIG. 1, the tab 82 extends from the left side of the shaft 80 into groove 64 of the collar 52. This holds collar 52 in its engaged position wherein splines 54 and 56 are in meshing engagement with splines 50 and 32, respectively, and torque can be transmitted from shaft 14 to shaft 16.

To disengage shaft 14 from shaft 16, the plug 72 is removed from opening 70 and a tool (not shown) is inserted through opening 70 and into groove 64, and the tool is then manipulated to slide collar 52 only axially to the right into the disengaged position shown in FIG. 2. The plug 72 is then preferably re-oriented so that the tab 82 is oriented to the right, and then plug 72 is re-inserted back into opening 70 so that tab 82 is received by groove 64. Tab 82 thereby holds collar 52 in its disengaged position wherein splines 56 are uncoupled from splines 32 and torque cannot be transmitted from shaft 14 to shaft 16.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the claims.

We claim:

1. A torque disconnect mechanism for controlling transmission of torque from a first shaft to a second shaft in a transmission, comprising:

a housing rotatably supporting the first and second shafts, the housing having an opening formed therein;

a hollow hub member receiving the first shaft and coupled for rotation with the first shaft, the hub member having hub splines on an outer surface of the hub member;

a hollow drive member receiving a portion of the hub member and coupled for rotation with the second shaft, the drive member having drive splines on an outer surface of the drive member; and a hollow annular coupling member receiving the hub member and the drive member, the coupling member having first and second sets of inner coupling splines separated axially by an annular groove, the coupling member being movable axially from an engaged position wherein the first and second sets of coupling splines are meshing with the hub splines and the drive splines, and to a disengaged position wherein one of the first and second sets or coupling splines is uncoupled from the hub splines and the drive splines.

2. The torque disconnect mechanism of claim 1, further comprising:

a plug member mountable in an opening in the housing, the plug member being engagable with the coupling member, the plug member being movable from a first position holding the coupling member in its engaged position to a second position holding the coupling member in its disengaged position.

3. The torque disconnect mechanism of claim 2 wherein: the plug member comprises a cylindrical head receivable in the opening, and a tab projecting from the head, the tab being engagable with the coupling member, and the tab being offset from a central axis of the head.

4. The torque disconnect mechanism of claim 2 wherein: the plug includes a tool-receiving aperture in an outer surface thereof.

5. A torque disconnect mechanism for controlling transmission of torque from a first shaft to a second shaft in a transmission, comprising:

a housing rotatably supporting the first and second shafts, the housing having an opening formed therein;

a hollow hub member receiving the first shaft and coupled for rotation with the first shaft, the hub member having hub splines on an outer surface of the hub member;

a hollow drive member receiving a portion of the hub member and coupled for rotation with the second shaft, the drive member having drive splines on an outer surface of the drive member; and a hollow annular coupling member receiving the hub member and the drive member, the coupling member having first and second sets of inner coupling splines separated axially by an annular groove, the coupling member being movable axially from an engaged position wherein the first and second sets of coupling splines are meshing with the hub splines and the drive splines, and to a disengaged position wherein one of the first and second sets or coupling splines is uncoupled from the hub splines and the drive splines, the annular groove receiving one of the hub and drive splines when the coupling member is in its disengaged position.

* * * * *